United States Patent
You et al.

(10) Patent No.: US 10,057,911 B2
(45) Date of Patent: Aug. 21, 2018

(54) TRANSMISSION AND RECEPTION METHOD OF MTC DEVICE LOCATED IN CELL COVERAGE EXPANSION AREA

(71) Applicant: LG ELECTRONICS INC., Seoul (KR)

(72) Inventors: Hyangsun You, Seoul (KR); YunJung Yi, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 15/024,964

(22) PCT Filed: May 16, 2014

(86) PCT No.: PCT/KR2014/004392
§ 371 (c)(1),
(2) Date: Mar. 25, 2016

(87) PCT Pub. No.: WO2015/076470
PCT Pub. Date: May 28, 2015

(65) Prior Publication Data
US 2016/0219607 A1    Jul. 28, 2016

Related U.S. Application Data

(60) Provisional application No. 61/907,396, filed on Nov. 22, 2013, provisional application No. 61/910,126, (Continued)

(51) Int. Cl.
*H04W 4/00*     (2018.01)
*H04W 72/12*   (2009.01)
(Continued)

(52) U.S. Cl.
CPC .......... *H04W 72/12* (2013.01); *H04L 5/0044* (2013.01); *H04L 5/0053* (2013.01);
(Continued)

(58) Field of Classification Search
CPC .......... H04W 72/042; H04W 72/0446; H04W 72/005
(Continued)

(56) References Cited

U.S. PATENT DOCUMENTS

2013/0250878 A1    9/2013  Sayana et al.
2013/0301524 A1   11/2013  Xu et al.
(Continued)

FOREIGN PATENT DOCUMENTS

EP          2605576        6/2013
WO       2013066083       5/2013

OTHER PUBLICATIONS

LG Electronics, "PDCCH transmission for MTC coverage enhancement," 3GPP TSG-RAN WG1 #75, R1-135461, Nov. 11-15, 2013, 6 pages.

(Continued)

*Primary Examiner* — Iqbal Zaidi
(74) *Attorney, Agent, or Firm* — Lee, Hong, Degerman, Kang & Waimey

(57) ABSTRACT

A disclosure of the present specification provides a transmission and reception method of a machine type communication (MTC) device. The transmission and reception method of the MTC device may comprise the steps of: receiving first scheduling information indicating that a bundle of first data can be transmitted or received in multiple first sub-frames; and receiving second scheduling information indicating that a bundle of second data can be transmitted or received in multiple second sub-frames. Herein, when a physical resource block (PRB) of some sub-frames (Continued)

of the multiple first sub-frames overlaps a PRB of some sub-frames of the multiple second sub-frames, only one of the bundle of the first data and the bundle of the second data can be transmitted and received in the overlapping sub-frame.

11 Claims, 22 Drawing Sheets

Related U.S. Application Data filed on Nov. 29, 2013, provisional application No. 61/932,806, filed on Jan. 29, 2014.

(51) Int. Cl.
    H04L 5/00          (2006.01)
    H04W 72/04         (2009.01)
    H04W 4/70          (2018.01)
(52) U.S. Cl.
    CPC .......... *H04L 5/0062* (2013.01); *H04L 5/0064* (2013.01); *H04W 4/70* (2018.02); *H04W 72/0453* (2013.01); *H04W 72/1289* (2013.01)

(58) Field of Classification Search
    USPC .................................................. 370/312–339
    See application file for complete search history.

(56) References Cited

U.S. PATENT DOCUMENTS

| | | | | |
|---|---|---|---|---|
| 2015/0109932 A1* | 4/2015 | Goldhamer | ....... | H04W 72/0453 370/236 |
| 2015/0181577 A1* | 6/2015 | Moulsley | .............. | H04L 5/0053 370/329 |
| 2015/0245323 A1* | 8/2015 | You | ..................... | H04W 72/042 370/329 |

OTHER PUBLICATIONS

LG Electronics, "PDCCH/PUSCH transmission for MTC coverage enhancement," 3GPP TSG-RAN WG1 #75, R1-135462, Nov. 11-15, 2013, 6 pages.

Motorola Mobility, "MTC Coverage improvement for Data Channels," 3GPP TSG-RAN WG1 #75, R1-135675, Nov. 11-15, 2013, 3 pages.

European Patent Office Application No. 14863832.3, Search Report dated Jun. 8, 2017, 10 pages.

* cited by examiner

TRANSMISSION AND RECEPTION METHOD OF MTC DEVICE LOCATED IN CELL COVERAGE EXPANSION AREA

CROSS-REFERENCE TO RELATED APPLICATIONS

This application is the National Stage filing under 35 U.S.C. 371 of International Application No. PCT/KR2014/004392, filed on May 16, 2014, which claims the benefit of U.S. Provisional Application Nos. 61/907,396, filed on Nov. 22, 2013, 61/910,126, filed on Nov. 29, 2013, and 61/932,806, filed on Jan. 29, 2014, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36. 211 V10. 4. 0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i. e., machine type communication (MTC), occurring between devices or between a device and a server without a human interaction, i. e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC apparatuses, wide service areas, low traffic for each MTC apparatus, etc.

Recently, it is considered to extend cell coverage of a BS for an MTC apparatus, and various schemes for extending the cell coverage are under discussion. However, when the cell coverage is extended, if the BS transmits a channel to the MTC apparatus located in the coverage extension region as if transmitting a channel to a normal UE, the MTC apparatus has a difficulty in receiving the channel.

Further, as the MTC apparatus is expected to have low performance in order to supply more MTC apparatuses at a low price, if the BS transmits a PDCCH or a PDSCH to the MTC apparatus located in the coverage extension region as if transmitting a PDCCH or a PDSCH to a normal UE, the MTC apparatus has a difficulty in receiving the PDCCH or the PDSCH.

SUMMARY OF THE INVENTION

Accordingly, the disclosure of the specification has been made in an effort to solve the problem.

To achieve the aforementioned purposes, when a machine type communication (MTC) apparatus is located in a coverage extension region of a base station (BS), the BS repeatedly transmits a PDCCH or PDSCH on a plurality of subframes (which is bundle transmission).

However, when the PDCCH or PDSCH is repeatedly transmitted on the plurality of subframes (which is bundle transmission), there is a possibility that the PDCCHs or PDSCHs overlap each other. However, as the MTC apparatus 100 is expected to support only one carrier (for example, without supporting carrier aggregation) with low performance for wide use at low costs, it causes a remarkable increase in complexity and a higher probability of decoding failure that the MTC apparatus receives a plurality of channels on some subframes.

To solve such problems, one embodiment of the present invention provides a transmission and reception method. The method may be performed by a machine type communication (MTC) apparatus and comprise: receiving first scheduling information indicating that a bundle of first data is transmittable or receivable in a plurality of first subframes; and receiving second scheduling information indicating that a bundle of second data is transmittable or receivable in a plurality of second subframes. Here, when a physical resource block (PRB) of some subframes of the first subframes overlaps a PRB of some subframes of the second subframes, only one of the bundle of the first data and the bundle of the second data is transmitted and received in the overlapping subframe. Also, when the bundle of the first data is cell-specific data, the bundle of the first data is transmitted or received.

When only one of the bundle of the first data and the bundle of the second data is transmitted, the other thereof may be punctured in the overlapping PRB.

In the overlapping subframe, transmission or reception of the bundle of the first data may be maintained, and transmission or reception of the bundle of the second data may be dropped.

The bundle of the second data may be user equipment-specific data.

In the overlapping subframe, transmission or reception of the bundle of the first data may be maintained, and transmission or reception of the bundle of the second data may be delayed.

When part of the first subframes overlap part of the second sub-frames but no PRBs overlap each other, both the bundle of the first data and the bundle of second data may be transmittable or receivable.

The bundle of the first data or the bundle of the second data may be received through a physical downlink shared channel (PDSCH) or physical uplink shared channel (PUSCH).

The first scheduling information and the second scheduling information may be transmitted through a physical downlink control channel (PDCCH).

Meanwhile, one embodiment of the present invention provides a machine type communication (MTC) apparatus. The MTC apparatus may comprise: a transceiver; and a processor configured to control the transceiver to receive first scheduling information indicating that a bundle of first data is transmittable or receivable in a plurality of first subframes and to receive second scheduling information indicating that a bundle of second data is transmittable or receivable in a plurality of second subframes. Here, when a physical resource block (PRB) of some subframes of the first subframes overlaps a PRB of some subframes of the second subframes, only one of the bundle of the first data and the bundle of the second data is transmitted and received in the overlapping subframe. Also, when the bundle of the first data is cell-specific data, the bundle of the first data is transmitted or received.

Embodiments of the present invention are provided to solve the foregoing problems of the conventional technology. Specifically, embodiments of the present invention may improve reception performance and decoding performance of an MTC apparatus located in a coverage extension region of a BS.

DESCRIPTION OF EXEMPLARY EMBODIMENTS

Figure 1:
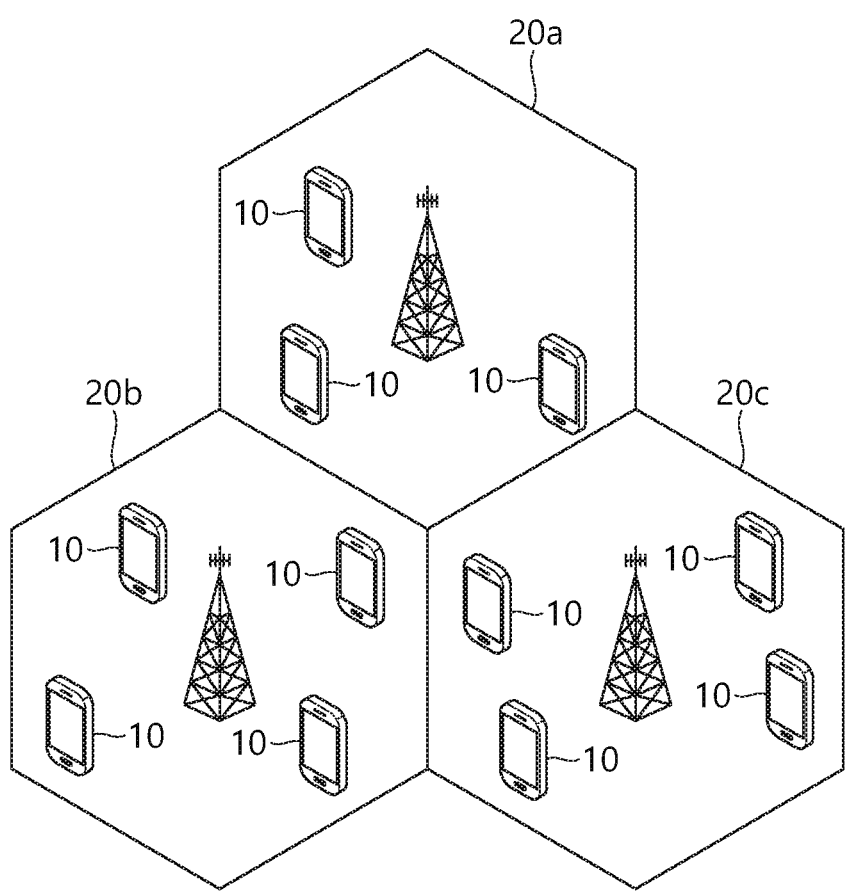
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
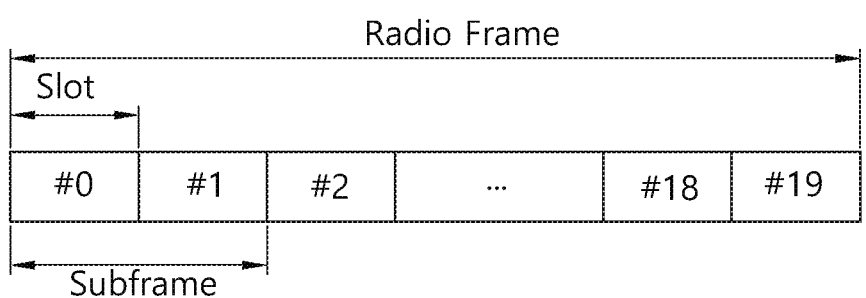
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36. 211 V10. 4. 0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
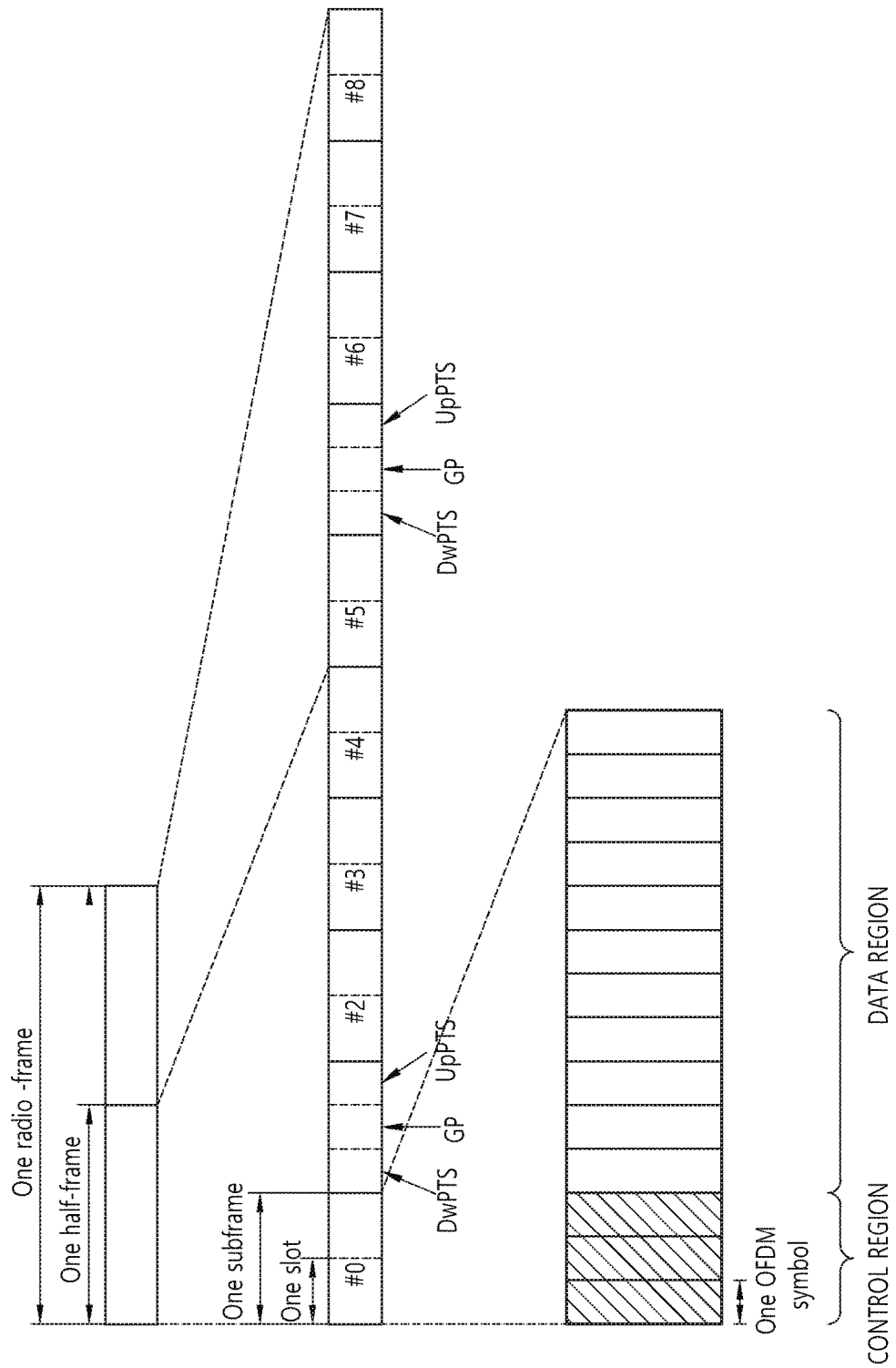
FIG. 3 illustrates the architecture of a downlink radio frame according to time division duplex (TDD) in 3GPP LTE.

FIG. 3 illustrates the architecture of a downlink radio frame according to TDD in 3GPP LTE.

For this, 3GPP TS 36. 211 V8. 7. 0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36. 211 V8. 7. 0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
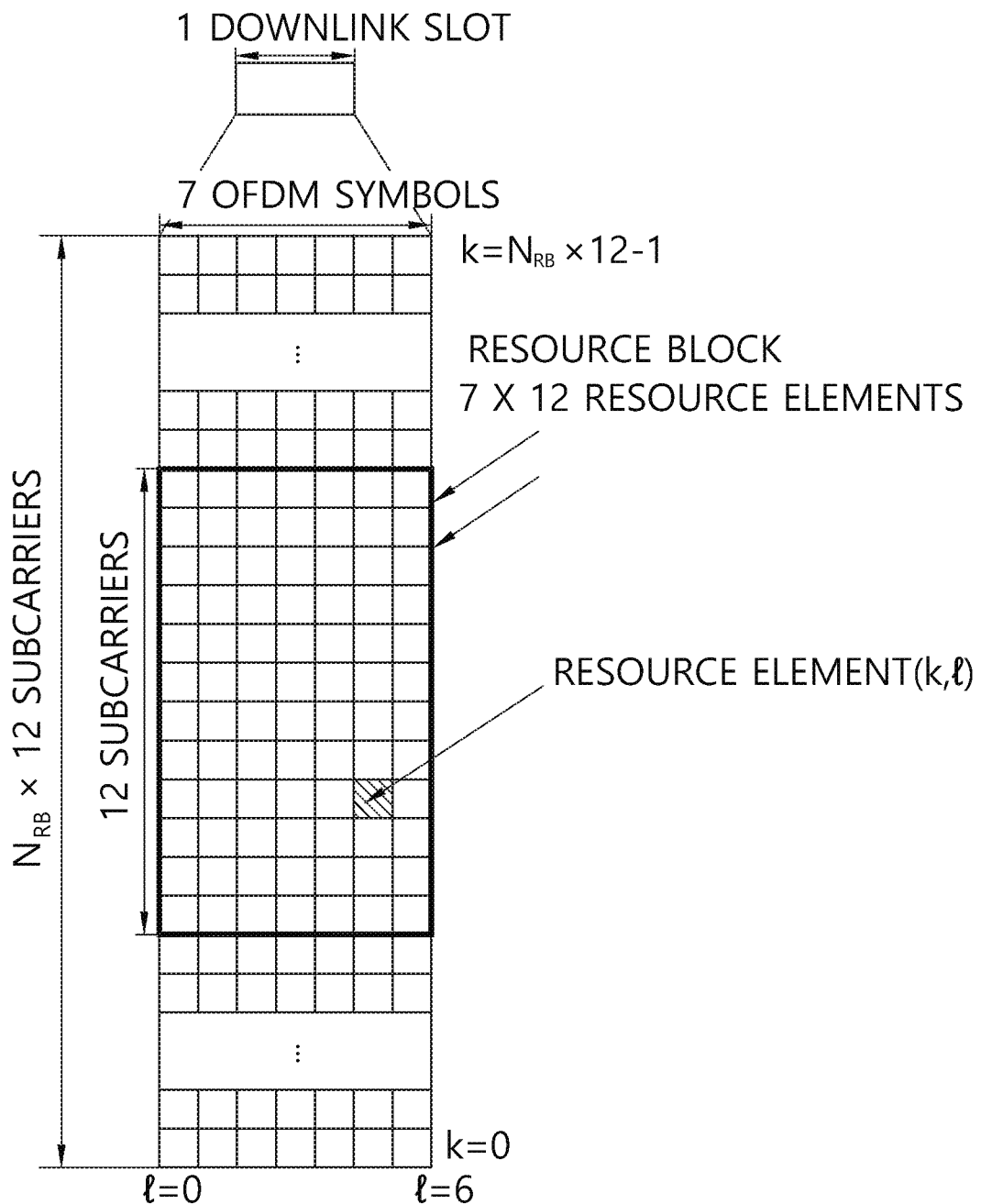
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i. e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i. e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
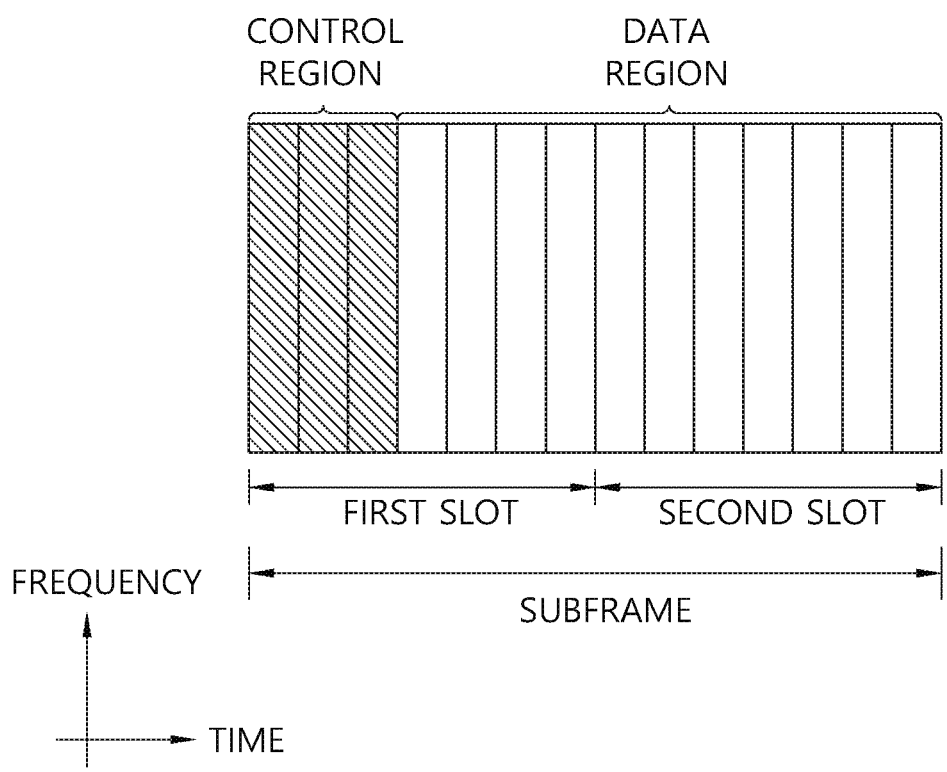
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36. 211 V10. 4. 0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i. e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
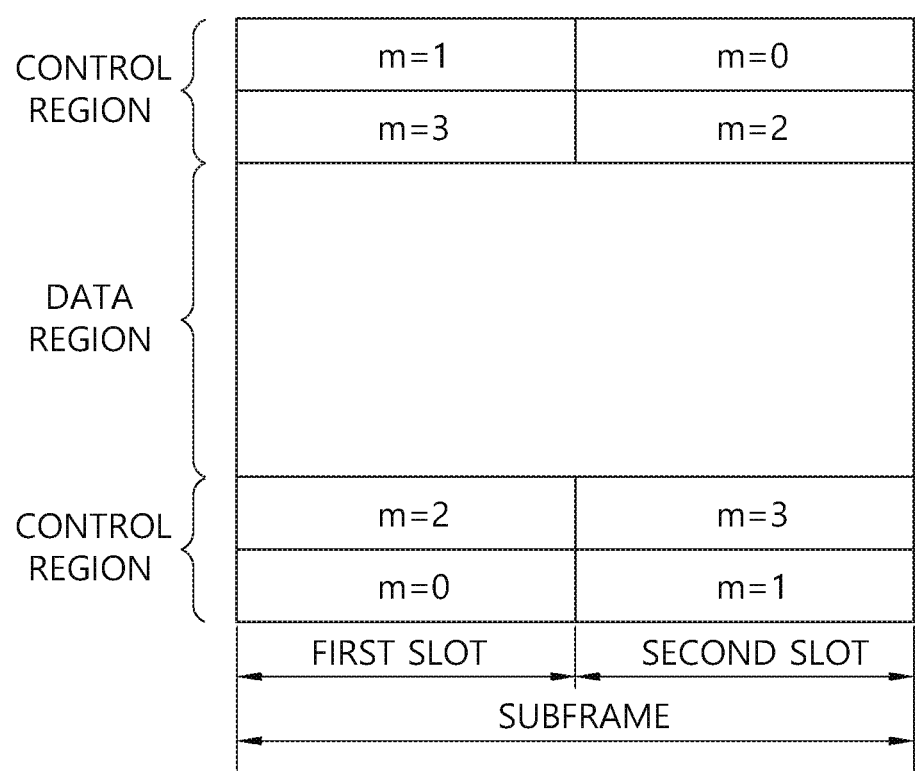
FIG. 6 illustrates the architecture of an uplink subframe in 3GPP LTE.

FIG. 6 shows a structure of an uplink subframe in 3GPP LTE.

Referring to FIG. 6, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel quality indicator (CQI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH.

A carrier aggregation system is now described.

Figure 7:
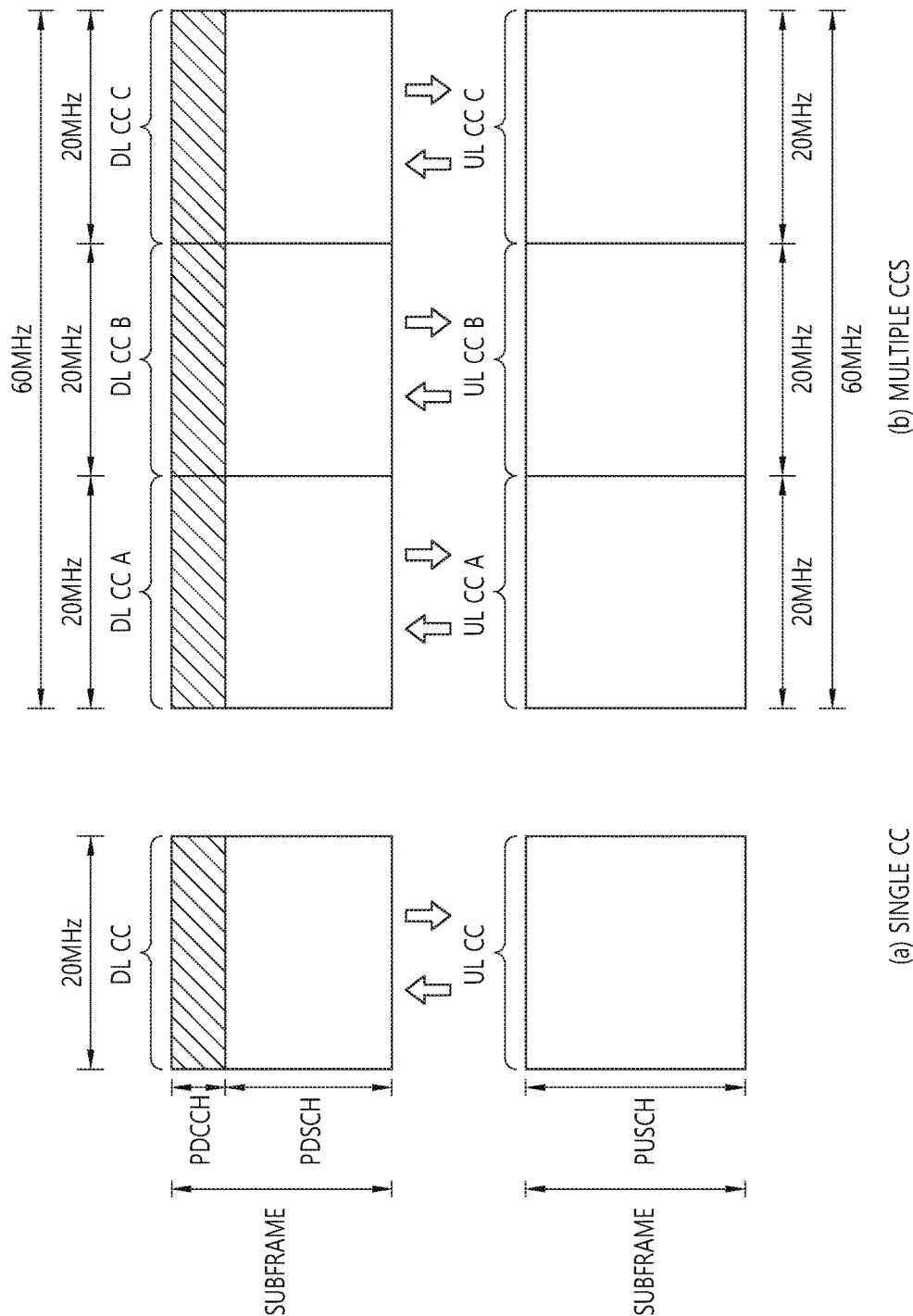
FIG. 7 illustrates an example of comparison between a single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i. e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i. e., the DCI format used in the LTE system), and the PDCCH architecture may reuse the existing coding method or resource allocation method (i. e., CCE-based resource mapping).

Figure 8:
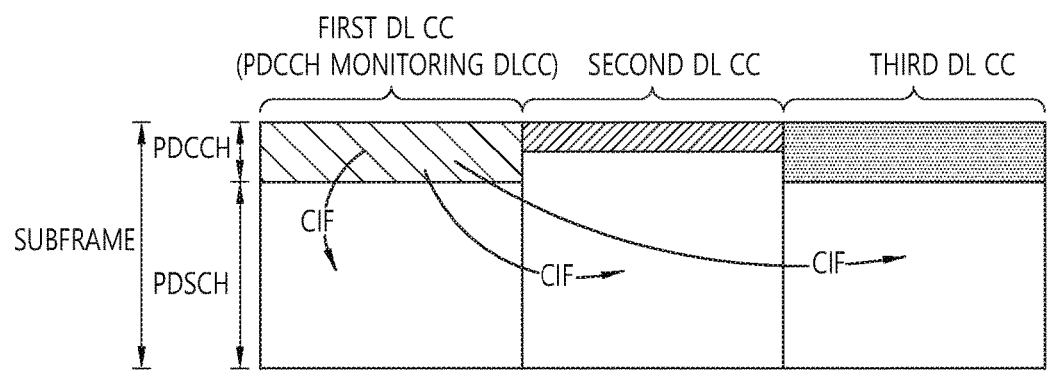
FIG. 8 exemplifies cross-carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 9A:
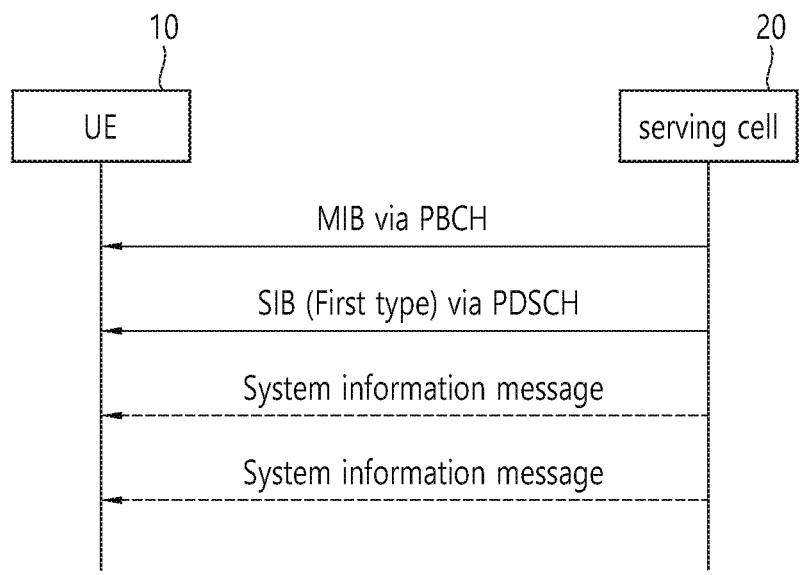
FIG. 9a illustrates an example of transmitted system information.

FIG. 9a illustrates an example of transmitting system information.

System information is classified into a master information block (MIB) and a plurality of system information blocks (SIB). The MIB includes the most important physical layer information on a cell. The SIBs includes different types. A first type of SIB includes information used to evaluate whether a UE is allowed to access a cell and scheduling information on another type of SIB. A second type of SIB (SIB type 2) includes information on common and shared channels. A third type of SIB (SIB type 3) includes cell reselection information related mostly to a serving cell. A fourth type of SIB (SIB type 4) includes frequency information on a serving cell and intra-frequency information on a neighbor cell related to cell reselection. A fifth type of SIB (SIB type 5) includes information on another E-UTRA frequency and inter-frequency information on a neighbor cell related to cell reselection. A sixth type of SIB (SIB type 6) includes information on a UTRA frequency and information on a UTRA neighbor cell related to cell reselection. A seventh type of SIB (SIB type 7) includes information on a GERAN frequency related to cell reselection.

As shown in FIG. 9a, the MIB is transmitted to a UE 10 via a PBCH. The first type of SIB (SIB type 1) is mapped to a DL-SCH and transmitted to the UE 10 via a PDSCH. Other types of SIBs are transmitted to the UE via a PDSCH through a system information message.

Figure 9B:
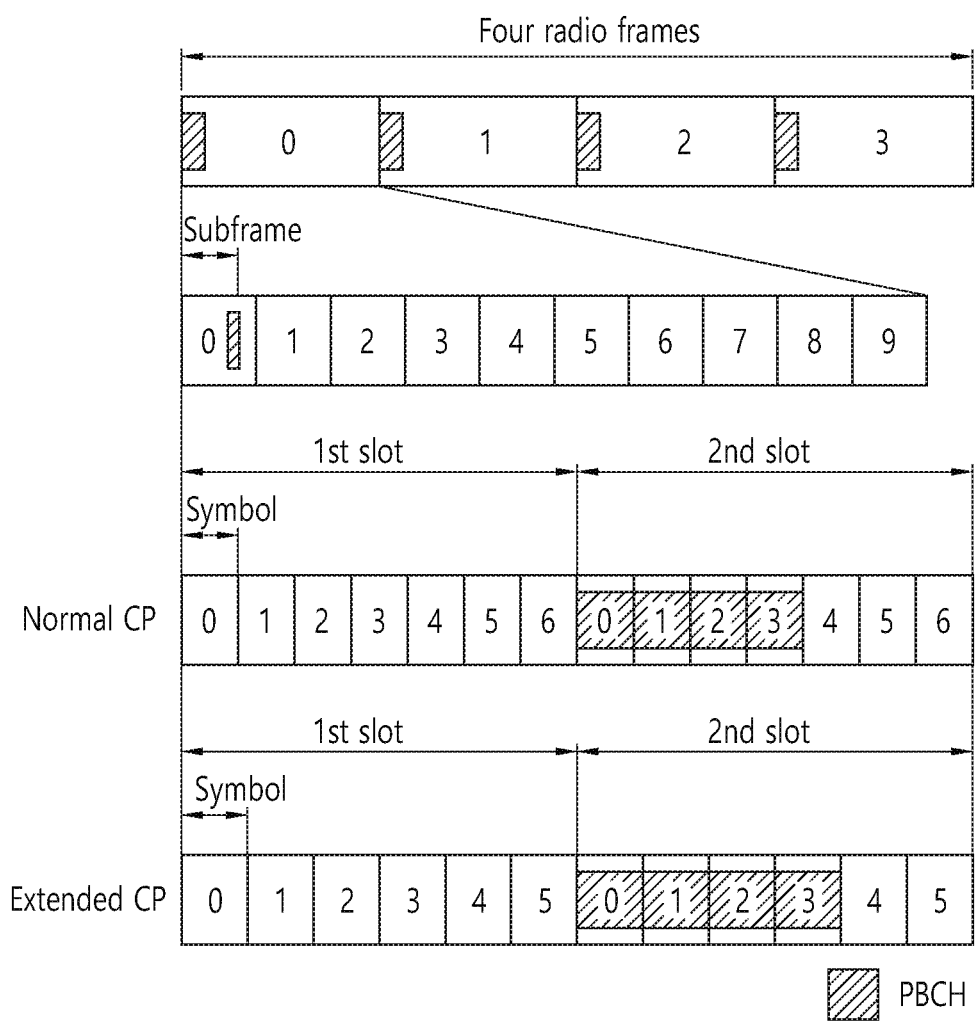
FIG. 9b illustrates a frame structure for a physical broadcast channel (PBCH) transmitting a master information block (MIB).

FIG. 9b illustrates a frame structure for a PBCH transmitting an MIB.

As illustrated, radio frames, subframes, and symbols are numbered from 0. A PBCH is transmitted in each radio frame, that is, every 10 ms.

Further, as illustrated, the PBCH is transmitted on subframe 0 of each radio frame. Specifically, the PBCH is transmitted on symbols 0, 1, 2, and 3 of a second slot.

The PBCH is used for each BS to transmit the most important MIB for system operations, and the MIB is retransmitted every 10 ms four times at a very low coring rate so that all STAs connected to a corresponding cell receive the MIB with reliability, thus enabling reception of the MIB even in considerably poor channel conditions.

Meanwhile, total 24-bit MIB information is defined in current LTE TS36. 331 as follows.

TABLE 2

```
-- ASN1START
MasterInformationBlock ::=SEQUENCE {
dl-BandwidthENUMERATED {
n6, n15, n25, n50, n75, n100},
phich-ConfigPHICH-Config,
systemFrameNumberBIT STRING (SIZE (8)),
spareBIT STRING (SIZE (10))
}
-- ASN1STOP
```

In each transmission of the MIB information, the same data determined for each cell is transmitted excluding a systemFrameNumber field. When an SIB including an MIB needs changing for any reason, all STAs within the cell are notified through separate RRC paging.

Figure 9C:
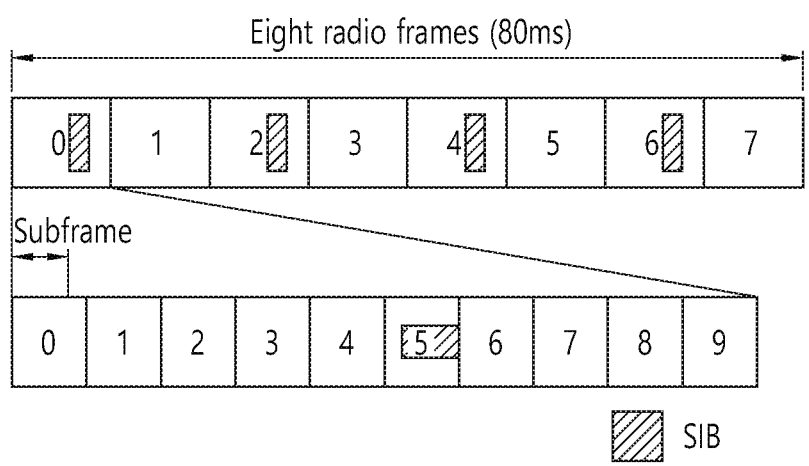
FIG. 9c illustrates an example of transmitting a first type of system information block (SIB) on a radio frame.

FIG. 9c illustrates an example of transmitting a first type of SIB on a radio frame.

As illustrated in FIG. 9c, the first type of SIB (that is, SIB type 1) is transmitted every 8 radio frames (that is, 80 ms), and is repeatedly retransmitted on a fifth subframe of a radio frame satisfying a system frame number (SFN) mod of 2 within a period of 8 radio frames.

Meanwhile, the first type of SIB (that is, SIB type 1) is defined in current LTE TS36. 331 as follows.

TABLE 3

```
-- ASN1START
SystemInformationBlockType1 ::=    SEQUENCE {
    cellAccessRelatedInfo         SEQUENCE {
        plmn-IdentityList         PLMN-IdentityList,
        trackingAreaCode          TrackingAreaCode,
        cellIdentity              CellIdentity,
        cellBarred                ENUMERATED {barred, notBarred},
        intraFreqReselection       ENUMERATED {allowed, notAllowed},
        csg-Indication            BOOLEAN,
        csg-Identity              CSG-Identity
    },
    cellSelectionInfo   SEQUENCE {
        q-RxLevMin         Q-RxLevMin,
        q-RxLevMinOffset    INTEGER (1 . . 8)
    },
    p-Max            P-Max
    freqBandIndicator       FreqBandIndicator,
    schedulingInfoList      SchedulingInfoList,
    tdd-Config        TDD-Config
    si-WindowLength        ENUMERATED {ms1, ms2, ms5, ms10, ms15, ms20, ms40},
    systemInfoValueTag    INTEGER (0 . . 31),
    nonCriticalExtension   SystemInformationBlockType1-v890-IEs
}
```

Hereinafter, MTC will be described.

Figure 10A:
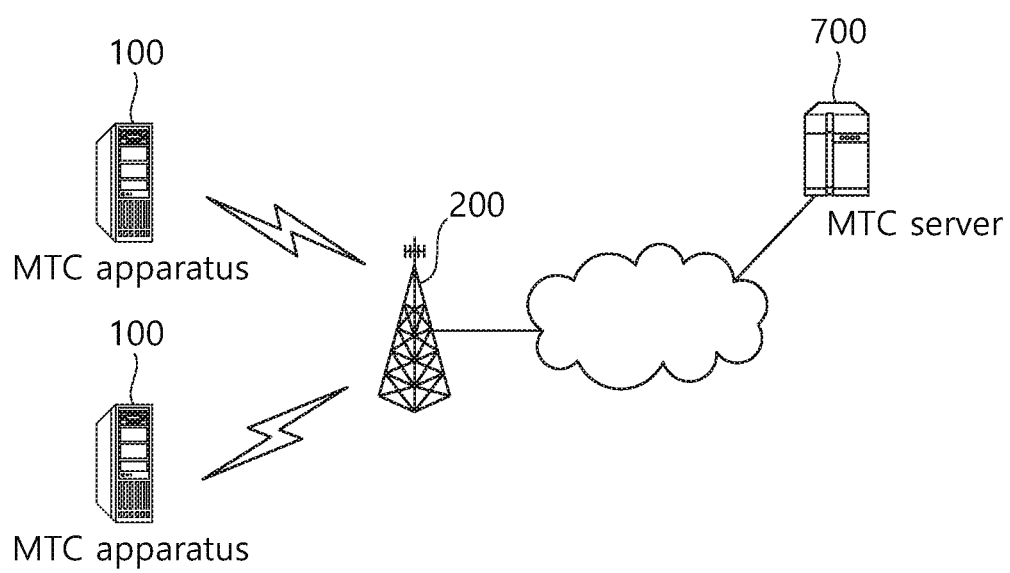
FIG. 10a illustrates an example of machine type communication (MTC).

FIG. 10a illustrates an example of machine type communication (MTC).

The MTC refers to information exchange performed between MTC apparatuses 100 via a BS 200 without human interactions or information exchange performed between the MTC apparatus 100 and an MTC server 700 via the BS.

The MTC server 700 is an entity for communicating with the MTC apparatus 100. The MTC server 700 executes an MTC application, and provides an MTC-specific service to the MTC apparatus.

The MTC apparatus 100 is a wireless device for providing the MTC, and may be fixed or mobile.

A service provided using the MTC is differentiated from an existing communication service requiring human intervention, and its service range is various, such as tracking, metering, payment, medical field services, remote controlling, etc. More specifically, examples of the service provided using the MTC may include reading a meter, measuring a water level, utilizing a surveillance camera, inventory reporting of a vending machine, etc.

The MTC apparatus is characterized in that a transmission data amount is small and uplink/downlink data transmission/reception occurs sometimes. Therefore, it is effective to decrease a unit cost of the MTC apparatus and to decrease battery consumption according to a low data transmission rate. The MTC apparatus is characterized of having a small mobility, and thus is characterized in that a channel environment does almost not change.

Figure 10B:
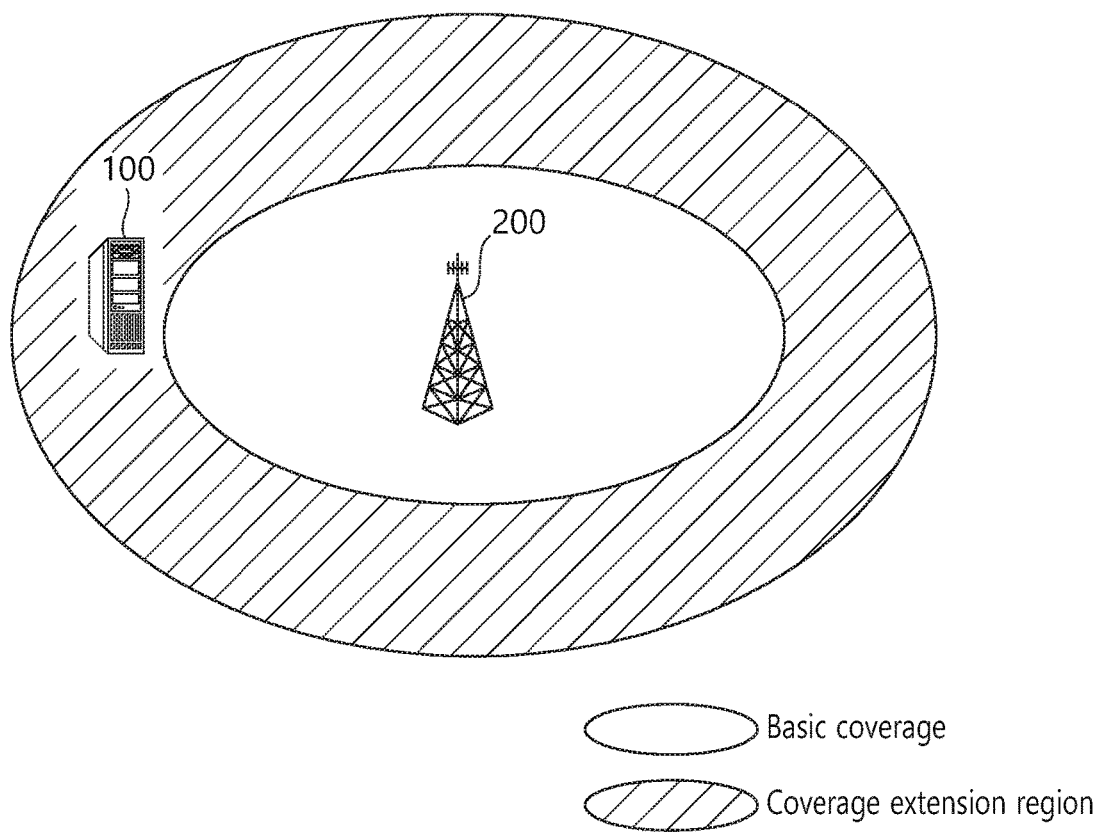
FIG. 10b illustrates an example of cell coverage extension for an MTC apparatus.

FIG. 10b illustrates an example of cell coverage extension for an MTC apparatus.

Recently, it is considered to extend cell coverage of a BS for an MTC apparatus 100, and various schemes for extending the cell coverage are under discussion.

However, when the cell coverage is extended, if the BS transmits a PDSCH and a PDCCH including scheduling information for the PDSCH to the MTC apparatus located in the coverage extension region as if it is transmitted to a normal UE, the MTC apparatus has a difficulty in receiving them.

<Embodiments of the Present Invention>

Thus, embodiments of the present invention are provided to solve the foregoing problem.

According to one embodiment of the present invention to solve the foregoing problem, when a BS transmits a PDSCH and a PDCCH to an MTC apparatus 100 located in a coverage extension region, the BS repeatedly transmits the PDSCH and the PDCCH on a plurality of subframes (for example, a bundle of subframes).

However, in an environment where the MTC apparatus and an ordinary UE are served by the same BS, when the BS repeatedly transmits a PDSCH and a PDCCH to the MTC apparatus located in the coverage extension region on a plurality of subframes, serving the ordinary UE may be restricted. To prevent operations for the MTC apparatus from causing damage to the ordinary UE, one embodiment allows the BS to serve the MTC apparatus and the ordinary UE in divided time periods according to time division multiplexing (TDM). Such TDM is performed in a long period of dozens of minutes or in a short period of multiple subframes.

Although the following description will be made mainly on a PDCCH for convenience, the same content thereof may also be applied to an EPDCCH.

Figure 11:
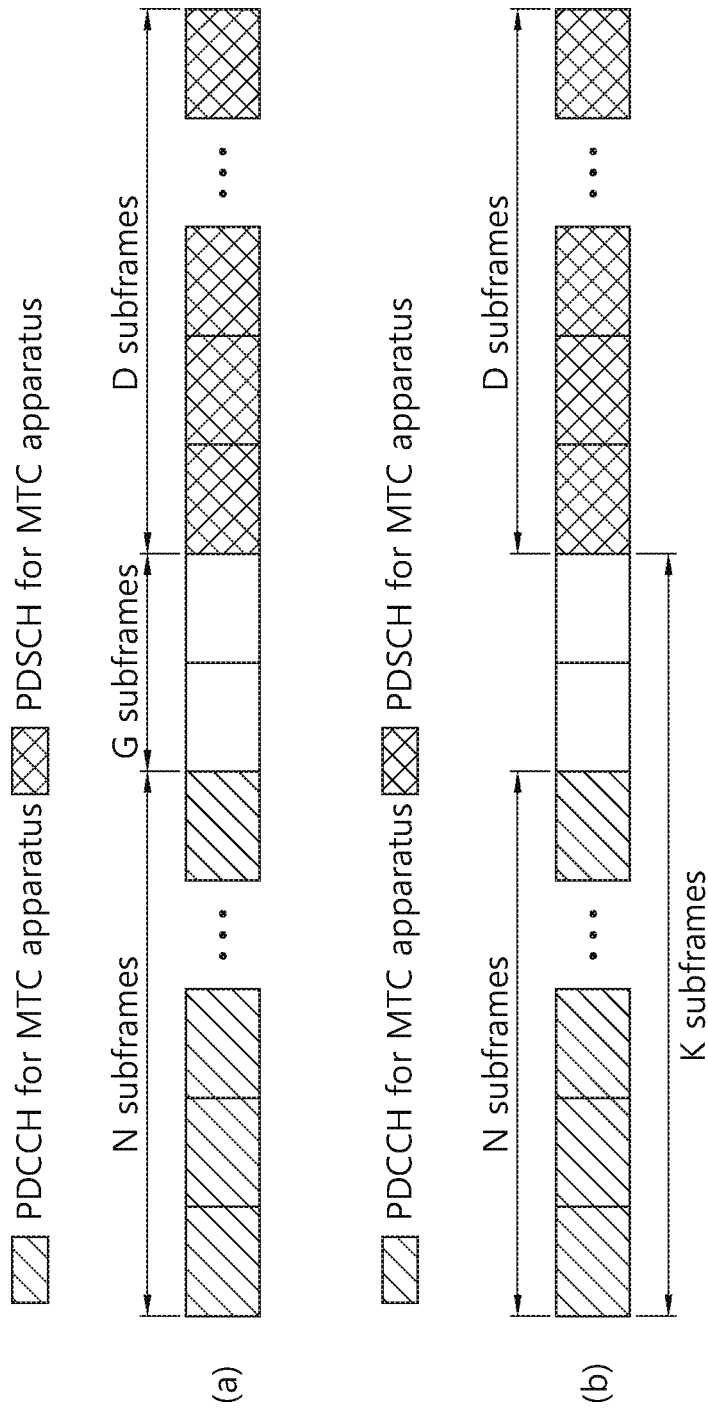
FIG. 11 illustrates an example of transmitting PDCCH and PDSCH bundles according to an embodiment of the present invention.

FIG. 11 illustrates an example of transmitting PDCCH and PDSCH bundles according to an embodiment of the present invention.

As illustrated in FIG. 11, a PDCCH and a PDSCH may be repeatedly transmitted on a plurality of subframes (which is bundle transmission) for an MTC apparatus 100 located in a coverage extension region. For example, a BS may transmit the PDCCH using a bundle of total N subframes.

Specifically, as illustrated in (a) of FIG. 11, transmission of the PDSCH may be started in a subframe located G subframes after a subframe in which repetitive transmission of the PDCCH including scheduling information is finished. For example, when the last PDCCH is transmitted through subframe N−1, the PDSCH bundle may be transmitted through D subframes from subframe N+G. Here, N and D may be set to the same value.

Alternatively, as illustrated in (b) of FIG. 11, transmission of the PDSCH bundle may be started in a subframe K subframes away from a location at which repetitive transmission of the PDCCH including the system information is started. Here, assuming that a difference between a subframe in which transmission of the PDCCH bundle is started and the subframe in which transmission of the PDSCH bundle is started is K subframes (for example, K=100 or 200), the MTC apparatus 100 needs to be aware of in which subframe transmission of the PDCCH bundle is started. For example, defining that K=PDSCH bundle transmission start subframe−PDCCH bundle transmission start subframe index, the MTC apparatus 100 may be successfully aware of a timing at which transmission of the PDSCH bundle is started only when the MTC apparatus 100 is aware of a timing at which the PDCCH is started. In this case, the MTC apparatus 100 may not necessarily be aware of the number of subframes used to transmit the PDCCH bundle.

Transmission of the PDCCH bundle may be performed only through predetermined subframes. A subframe location at which transmission of the PDCCH bundle is started may have a predetermined fixed value. The fixed value may be notified to the MTC apparatus through an MIB. For example, when the subframe location at which transmission of the PDCCH bundle is started is obtained by SFN % N=0 (for example, N=20), N may be notified to the MTC apparatus through the MIB. Alternatively, when the subframe location at which transmission of the PDCCH bundle is started is determined, for example, based on an offset (for example, SFN % N=offset), the offset value may be notified to the MTC apparatus through the MIB. For example, transmission of the PDCCH bundle for the MTC apparatus 100 may be started only in a subframe or SFN corresponding to a multiple of 100 (subframe 0, 100, 200, 300, . . . ). Here, the MTC apparatus 100 may attempt to receive the PDCCH bundle through N subframes starting from a subframe or SFN corresponding to a multiple of 100. The subframe location at which transmission of the PDCCH bundle is started may be varied for each MTC apparatus. In this case, information on the subframe location at which transmission of the PDCCH bundle is started may be notified to the MTC apparatus through a higher-layer signal, such as an RRC signal.

Figure 12:
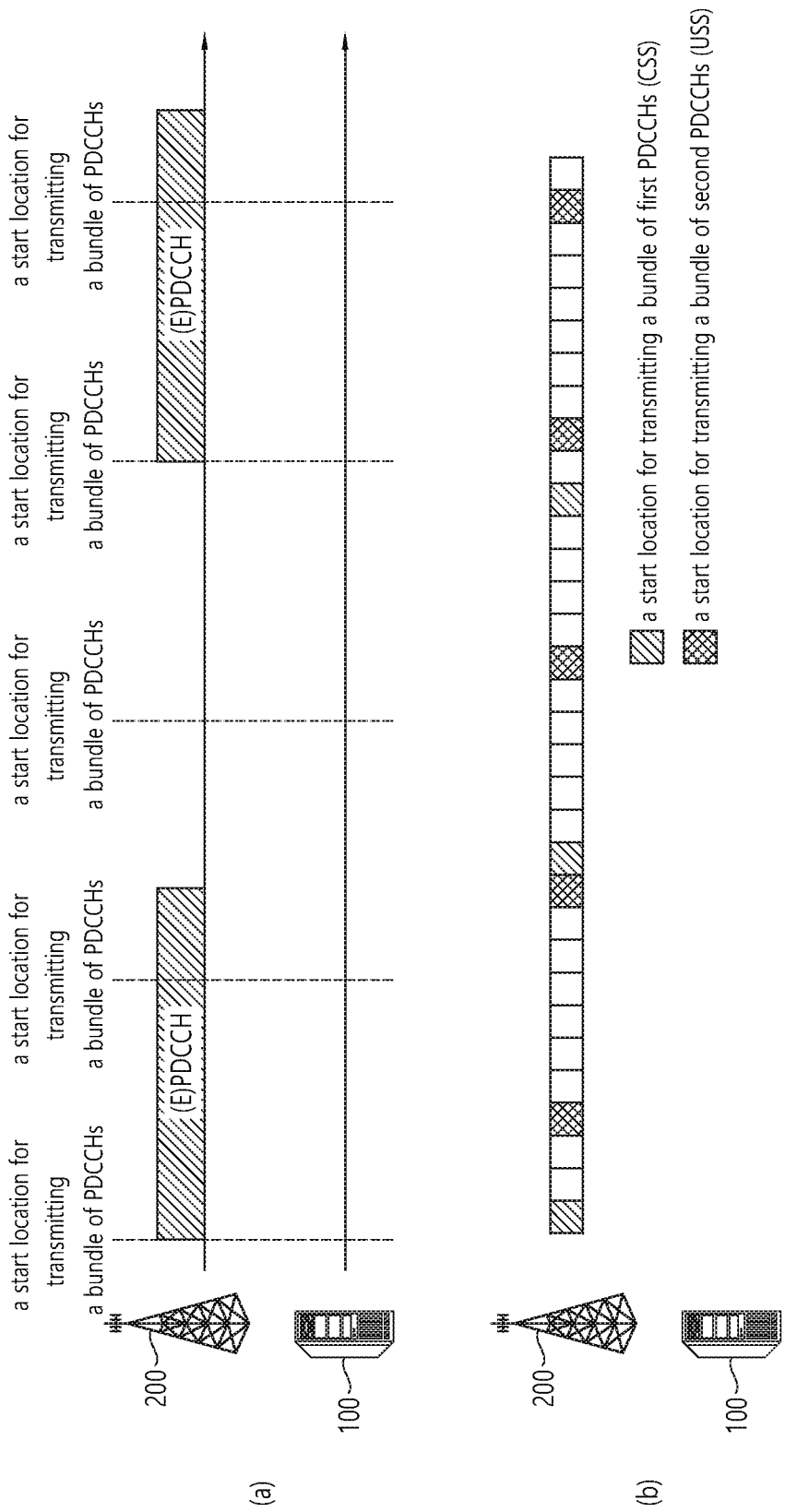
FIG. 12 illustrates an example of a period in which PDCCH bundle transmission can be started and a PDCCH bundle transmission duration according to an embodiment of the present invention.

FIG. 12 illustrates an example of a period in which PDCCH bundle transmission can be started and a PDCCH bundle transmission duration according to an embodiment of the present invention.

As illustrated in (a) of FIG. 12, a location at which PDCCH bundle transmission can be started may be determined according to a specific period. However, the length of a PDCCH bundle is longer than the period in which PDCCH bundle transmission can be started, the MTC apparatus 100 may not properly receive the PDCCH bundle, or needs to receive all two or more PDCCHs transmitted at different timings, involving an increase in complexity. To solve this problem, in one embodiment, the MTC apparatus 100 may assume that only one PDCCH bundle is transmitted from the BS 200 at a time.

In FIG. 12(b), a subframe in which a PDCCH repetition is started, that is, transmission of a PDCCH bundle is started, is denoted by a transmission start subframe for a PDCCH bundle. Here, a location of the transmission start subframe for the PDCCH bundle may be configured independently for a common search space (CSS) and a UE-specific space (USS). For example, as illustrated in FIG. 12(b), when the location of the transmission start subframe for the PDCCH bundle is defined by a period and offset, a period and offset of a transmission start subframe for a PDCCH bundle transmittable in the CSS may be configured independently of a period and offset of a transmission start subframe for a PDCCH bundle transmittable in the USS. Thus, in some cases, a start subframe for a first PDCCH bundle may overlap a start subframe for a second PDCCH bundle in the same CSS or the same USS. However, attempting to blind-decode two PDCCHs in one search space may cause an increase in complexity. Likewise, it may cause an increase in complexity that the MTC apparatus 100 attempts to blind-decode PDCCHs in one subframe through two search spaces.

Thus, according to one embodiment, a BS 200 may adjust the start subframe for the first PDCCH bundle and the start subframe for the second PDCCH bundle, transmittable in the same search space (for example, the same CSS or the same USS), not to overlap. To this end, the BS 200 may need to configure a period of a start subframe for a PDCCH bundle to be equal to or longer than the length of the PDCCH bundle. Alternatively, the BS 200 may not transmit a second PDCCH bundle, even though present, until transmission of a first PDCCH bundle is finished in the same CSS or the same USS. Thus, the MTC apparatus 100 may assume that the first PDCCH bundle and the second PDCCH bundle do not overlap each other even in a portion of a subframe in the same CSS or the same USS. When the first PDCCH bundle and the second PDCCH bundle overlap even in a portion of a subframe, the MTC apparatus 100 may not attempt to receive one PDCCH bundle until decoding the other PDCCH bundle is finished. If the MTC apparatus 100 attempts to receive a PDCCH bundle, the MTC apparatus 100 may drop or neglect a previous or later PDCCH.

Meanwhile, in some cases, the start subframe for the first PDCCH bundle transmittable in the CSS may overlap the start subframe for the second PDCCH bundle transmittable in the USS. According to one embodiment, in this case, the BS may perform PDCCH transmission as follows. First, in attempting to transmit a first PDCCH bundle having a DCI CRC scrambled with a C-RNTI, when there is a second PDCCH bundle having a DCI CRC scrambled with the same C-RNTI, the BS 200 may transmit only one (a PDCCH bundle transmitted in the CSS or a PDCCH bundle transmitted in the USS) of the two PDCCH bundles. That is, when there are two or more PDCCHs having a DCI CRC scrambled with the same RNTI (for example, C-RNTI or MTC apparatus-specific RNTI) for one MTC apparatus, the PDCCHs may not be transmitted simultaneously. Alternatively, when both a first PDCCH and a second PDCCH include a downlink grant (or uplink grant), the BS 200 may transmit only one (a PDCCH bundle transmitted in the CSS or a PDCCH bundle transmitted in the USS) of the two PDCCH bundles.

Meanwhile, when the BS repeatedly transmits a PDCCH or PDSCH on a plurality of subframes (which is bundle transmission) according to one embodiment of the present invention, the PDCCHs or PDSCHs may overlap in some frames. Hereinafter, overlapping cases are illustrated in drawings, and solutions thereto are described.

Figure 13:
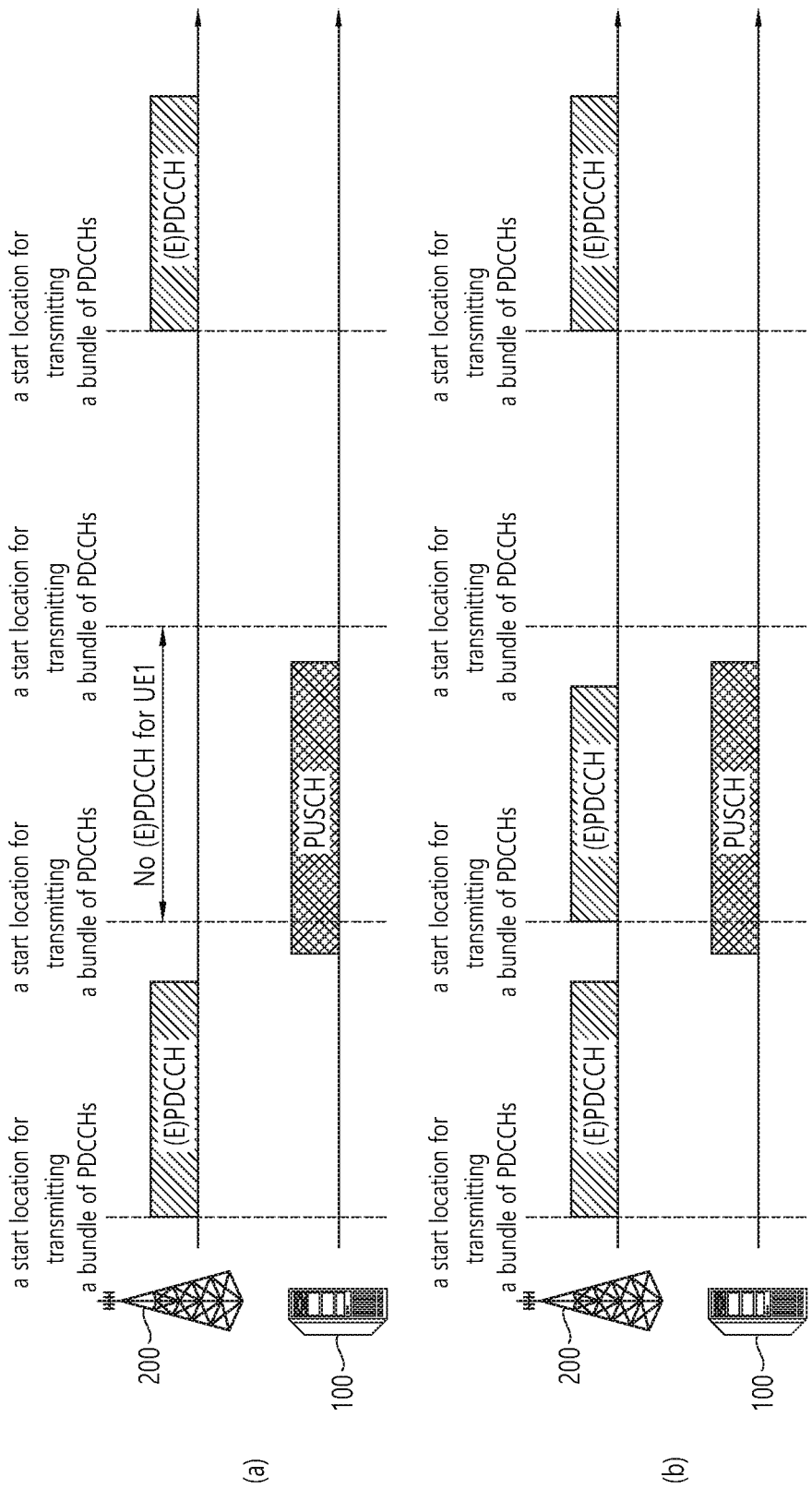
FIG. 13 illustrates a case where a PDCCH bundle overlaps a PUSCH bundle in the embodiment of the present invention.

FIG. 13 illustrates a case where a PDCCH bundle overlaps a PUSCH bundle in the embodiment of the present invention.

As illustrated in FIG. 13, the MTC apparatus 100 located in the coverage extension region may repeatedly transmit an uplink channel, for example, a PUSCH, on a plurality of subframes (which is bundle transmission).

Here, while a BS 200 is transmitting a PDCCH bundle to the MTC apparatus 100 on predetermined subframes, when the MTC apparatus 100 attempts to transmit a PUSCH bundle, PDCCHs and PUSCHs may overlap each other in some frames.

To solve this problem, as illustrated in (a) of FIG. 13, the MTC apparatus 100 may assume that no PDCCH is transmitted from the BS 200 while transmitting the PUSCH bundle.

Alternatively, as illustrated in (b) of FIG. 13, the MTC apparatus 100 may attempt to receive a new PDCCH bundle simultaneously with transmitting the PUSCH bundle. Here, the MTC apparatus 100 may assume that the PDCCH bundle, received while transmitting the PUSCH bundle, includes no uplink grant.

Alternatively, when reception of the PDCCH bundle from the BS 200 is finished before transmission of the PUSCH bundle is finished, the MTC apparatus 100 may assume that the PDCCHs include no uplink grant. Alternatively, when transmission of the PDCCH bundle is finished in a subframe located X subframes (for example X=4) before a subframe in which transmission of the PUSCH bundle is finished, the MTC apparatus 100 may assume that the PDCCHs include no uplink grant.

Figure 14:
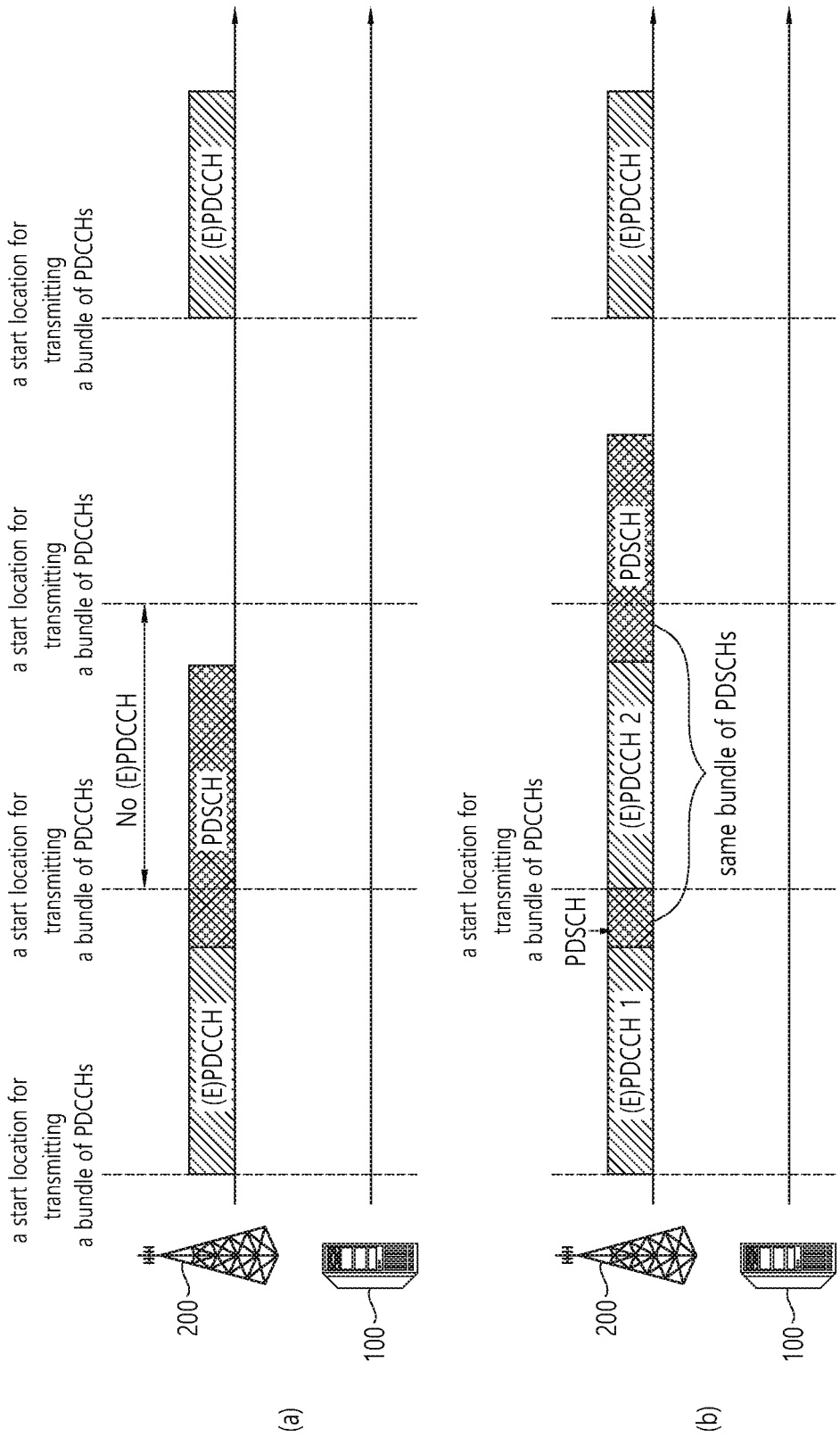
FIG. 14 illustrates a case where a PDCCH bundle overlaps a PDSCH bundle in the embodiment of the present invention.

FIG. 14 illustrates a case where a PDCCH bundle overlaps a PDSCH bundle in the embodiment of the present invention.

As described above, a PDCCH may be repeatedly transmitted through a plurality of consecutive or non-consecutive subframes (which is bundle transmission) for the MTC apparatus 100, and the subframes may be predetermined.

However, the MTC apparatus 100 may need to receive a PDSCH bundle while receiving the PDCCH bundle. Alternatively, the MTC apparatus 100 may need to receive a PDCCH bundle while receiving the PDSCH bundle. That is, the PDCCH and the PDSCH bundle may overlap each other in some subframes. However, as the MTC apparatus 100 is expected to support only one carrier (for example, without supporting carrier aggregation) with low performance for wide use at low costs, it causes a remarkable increase in complexity that the MTC apparatus 100 simultaneously receives the PDCCH bundle and the PDSCH bundle.

To solve this problem, as illustrated in FIG. (a) of FIG. 14, the MTC apparatus 100 may assume that a new PDCCH bundle is not transmitted from a BS 200 while the MTC apparatus 100 is receiving one PDSCH bundle. Alternatively, the MTC apparatus 100 may assume that a PDCCH bundle including a new downlink grant is not transmitted from the BS 200 while the MTC apparatus 100 is receiving one PDSCH bundle.

Alternatively, as illustrated in (b) of FIG. 14, when a subframe for receiving a PDSCH bundle overlaps a subframe for starting transmission of a new PDCCH bundle, the MTC apparatus 100 may suspend receiving the PDSCH bundle that the MTC apparatus 100 is receiving and attempt to receive the new PDCCH bundle. Alternatively, assuming that a PDCCH bundle for another UE can be transmitted during a period in which the PDCCH bundle can be transmitted, the MTC apparatus 100 may temporarily suspend receiving the PDSCH bundle that the MTC apparatus 100 is receiving and also not attempt to receive the PDCCH bundle. After reception of the PDCCH bundle is finished or after the subframe in which the PDCCH bundle is transmitted, the MTC apparatus 100 may resume receiving the suspended PDSCH bundle. As such, when the MTC apparatus 100 suspends receiving the PDSCH bundle and attempts to receive a new PDCCH bundle, the BS 200 may not transmit a downlink grant to the MTC apparatus 100 in the PDCCH bundle, allowing transmission of only an uplink grant.

Figure 15:
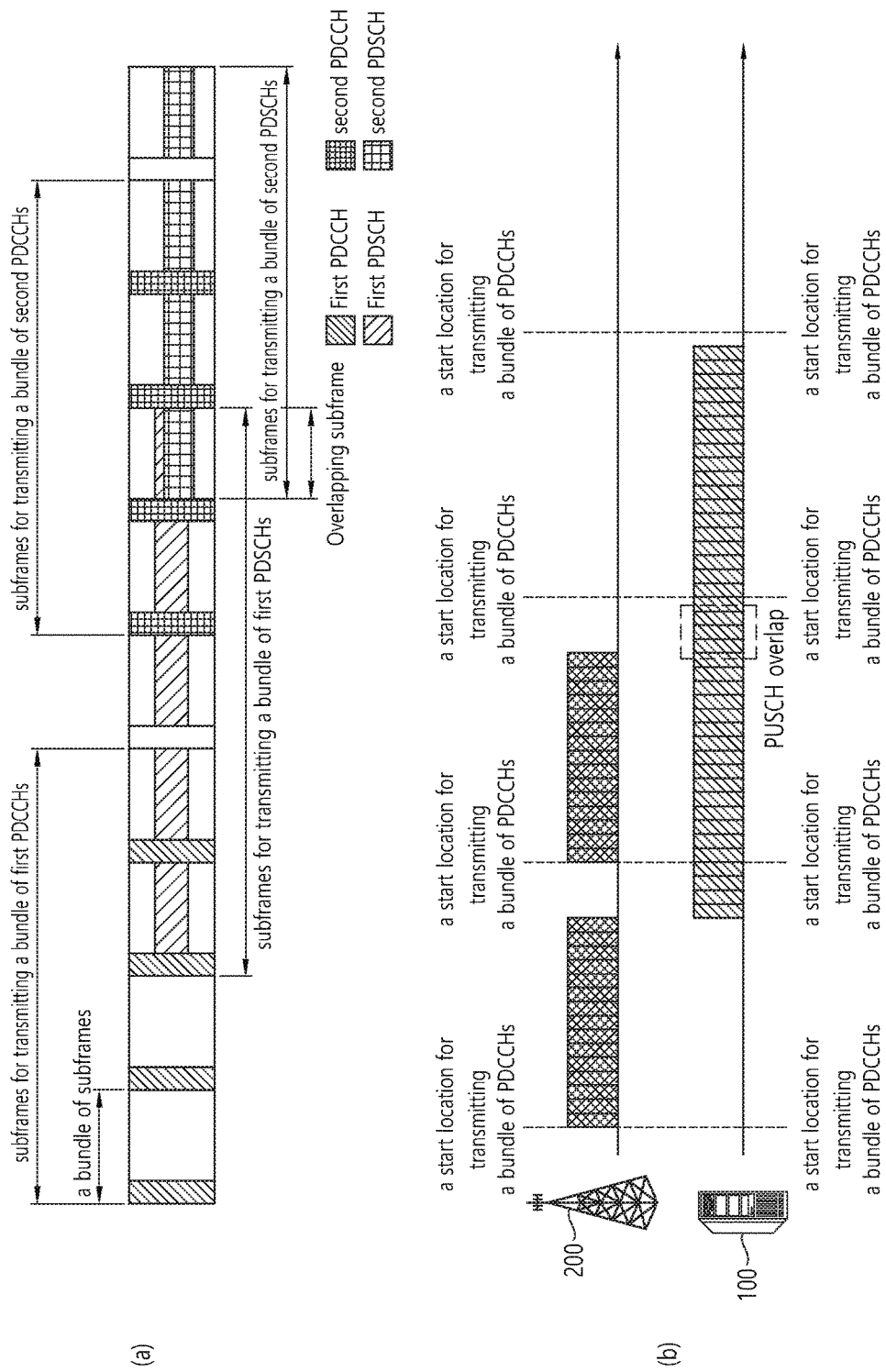
FIG. 15 illustrates a case where a first PDSCH (or first PUSCH) bundle overlaps a second PDSCH (or second PUSCH) bundle in the embodiment of the present invention.

FIG. 15 illustrates a case where a first PDSCH (or first PUSCH) bundle overlaps a second PDSCH (or second PUSCH) bundle in the embodiment of the present invention.

As illustrated in (a) of FIG. 15, while the MTC apparatus 100 is receiving a first PDSCH bundle scheduled based on a first PDCCH bundle, a second PDCCH bundle and a second PDSCH bundle scheduled based on the second PDCCH may be transmitted. In this case, the MTC apparatus 100 may receive the second PDCCH bundle and even the second PDSCH scheduled based on the second PDCCH when reception of the first PDSCH bundle is not yet finished, thus causing a remarkable increase in complexity. That is, as the MTC apparatus 100 is expected to support only one carrier (for example, without supporting carrier aggregation) with low performance for wide use at low costs, it causes a remarkable increase in complexity that the MTC apparatus 100 simultaneously receives the first PDSCH bundle and the second PDSCH bundle.

Further, as illustrated in (b) of FIG. 15, when the MTC apparatus 100 receives the second PDCCH while transmitting a first PUSCH scheduled based on the first PDCCH, the MTC apparatus 100 needs to transmit a second PUSCH scheduled based on the second PUCCH, causing a remarkable increase in complexity.

Thus, solutions to the aforementioned problems will be described below.

<First Solution to the Problem Illustrated in FIG. 15>

According to a first solution, transmission timings for the first PDSCH bundle and transmission of the second PDSCH bundle may be maintained to avoid a collision between a subframe for the first PDSCH and a subframe for the second PDSCH. The first solution may be described separately for a case where a transmission resource for the first PDSCH and a transmission resource for the second PDSCH do not overlap each other and for a case where the transmission resources overlap each other. The first solution may also be applied to PUSCHs.

When the transmission resource for the first PDSCH does not overlap the transmission resource for the second PDSCH, the MTC apparatus 100 may receive the first PDSCH and the second PDSCH in a subframe in which the first PDSCH overlaps the second PDSCH but decode only the first PDSCH to reduce complexity. Likewise, when a transmission resource for a first PUSCH does not overlap a transmission resource for a second PUSCH, the MTC apparatus may simultaneously transmit both the PUSCHs.

However, when the transmission resource for the first PDSCH overlaps the transmission resource for the second PDSCH, the MTC apparatus 100 may attempt to receive the two PDSCHs according to any one of the following examples.

In a first example, the BS 200 may transmit only the first PDSCH, not transmitting the second PDSCH, in the overlapping subframe. That is, the BS may skip transmission of the second PDSCH during the overlapping period and start transmitting the second PDSCH when the overlapping period is over. Here, a transmission subframe period for the second PDSCH is not delayed but the second PDSCH in the overlapping period is punctured. Thus, the MTC apparatus 100 may assume that only the first PDSCH is transmitted from the BS in the overlapping period and the second PDSCH is punctured in a corresponding PRB region.

In a second example, the BS 200 may transmit only the second PDSCH, not transmitting the first PDSCH, in the overlapping period. That is, the BS may puncture the first PDSCH in the overlapping PRB region. Thus, the MTC apparatus 100 does not receive the first PDSCH but receives the second PDSCH in a subframe in which transmission of the second PDSCH is started. Alternatively, when the two PDSCHs collide, the MTC apparatus 100 may not receive the first PDSCH from a time at which the second PDCCH is successfully decoded and may subsequently receive the second PDSCH.

In a third example, the MTC apparatus 100 continues to receive the first PDSCH and drops reception of the second PDSCH. That is, the MTC apparatus 100 does not receive the second PDSCH, considering the second PDSCH as an ineffective PDSCH, but continues to receive the first PDSCH.

In a fourth example, when transmission of the first PDSCH is not finished before a subframe in which transmission of the second PDSCH is started, the MTC apparatus 100 may determine both PDSCHs as ineffective PDSCHs and not receive the two PDSCHs. Alternatively, when transmission of the first PDSCH is not finished until the second PDCCH is successfully decoded, the MTC apparatus 100 may determine both PDSCHs as ineffective PDSCHs and not receive both PDSCHs.

In the above examples, the following factors may be considered in determining a subframe or PRB in which any one of the PDSCHs is not transmitted or is punctured. First, when transmission subframe periods for a cell-specific PDSCH and an MTC apparatus-specific (UE-specific) PDSCH overlap, the MTC apparatus-specific (UE-specific) PDSCH is punctured/rate-matched. Next, when transmission subframe periods for a PDSCH including an SIB, a paging signal or a random access response (RAR) and a MTC apparatus-specific (UE-specific) PDSCH overlap, the MTC apparatus-specific (UE-specific) PDSCH is punctured/rate-matched. For example, when an SIB is transmitted through the first PDSCH and an MTC apparatus-specific (UE-specific) PDSCH is transmitted through the second PDSCH, the second PDSCH may not be transmitted, be punctured or be rate-matched in a subframe or PRB region in which the second PDSCH and the first PDSCH overlap. Alternatively, when an MTC apparatus-specific (UE-specific) PDSCH is transmitted through the first PDSCH and an SIB is transmitted through the second PDSCH, the first PDSCH may not be transmitted, be punctured or be rate-matched in a subframe or PRB region in which the second PDSCH and the first PDSCH overlap.

<Second Solution to the Problem Illustrated in FIG. 15>

According to a second solution, a difference between a subframe in which transmission of the first PDCCH bundle is started and a subframe in which transmission of the second PDCCH bundle is started, that is, a PDCCH bundle transmission period, may be adjusted to avoid a collision between a subframe for the first PDSCH and a subframe for the second PDSCH. To avoid the collision between the transmission subframes for the first PDSCH and the second PDSCH, a period of a subframe in which transmission of a PDCCH bundle is started may be set sufficiently long. To this end, the period of the subframe in which transmission of the PDCCH bundle is started may be set equal to or longer than 'an interval between a last subframe for the PDCCH and a first subframe for a PDSCH bundle'+'the length of subframes for the PDSCH bundle,' which may be applied to a PUSCH in a similar manner. That is, a period of a subframe in which transmission of the PDCCH bundle is started may be set equal to or longer than 'an interval between a last subframe for the PDCCH and a first subframe for a PUSCH bundle'+'the length of subframes for the PDSCH bundle.'

<Third Solution to the Problem Illustrated in FIG. 15>

According to a third solution, a reception timing of the second PDSCH may be delayed to avoid a collision between a subframe for the first PDSCH and a subframe for the second PDSCH, which will be described in detail with reference to FIG. 16.

Figure 16:
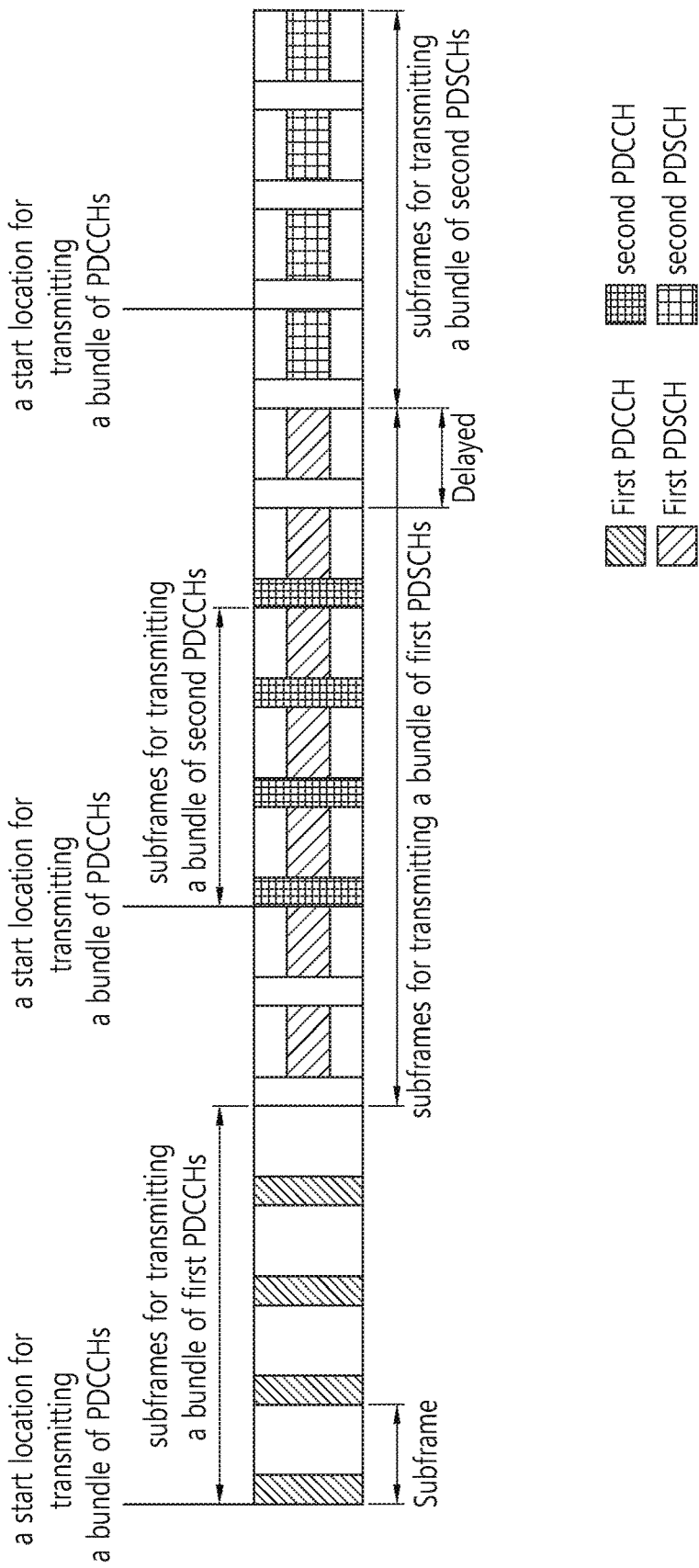
FIG. 16 illustrates a solution to a case where a first PDSCH bundle overlaps a second PDSCH bundle in the embodiment of the present invention.

FIG. 16 illustrates a solution to a case where a first PDSCH bundle overlaps a second PDSCH bundle in the embodiment of the present invention.

When the transmission subframes for the first PDSCH and the second PDSCH collide, as illustrated in FIG. 16, the BS may delay transmission of the second PDSCH until finishing transmission of the first PDSCH. That is, as illustrated in FIG. 16, when the transmission subframes for the first PDSCH and the second PDSCH collide, the MTC apparatus 100 continues to receive the first PDSCH, assuming that the second PDSCH is started in a next subframe when the first PDSCH is completely transmitted. Here, transmission of the second PDSCH bundle is delayed overall.

Likewise, in the case of a PUSCH, when transmission subframes for the first PUSCH and the second PUSCH collide, the MTC apparatus 100 may delay transmission of the second PUSCH until finishing transmission of the first PUSCH.

<Fourth Solution to the Problem Illustrated in FIG. 15>

According to a fourth solution, a reception timing of the second PDCCH including a downlink grant for the second PDSCH may be delayed to avoid a collision between a subframe for the first PDSCH and a subframe for the second PDSCH, which will be described in detail with reference to FIG. 17.

Figure 17:
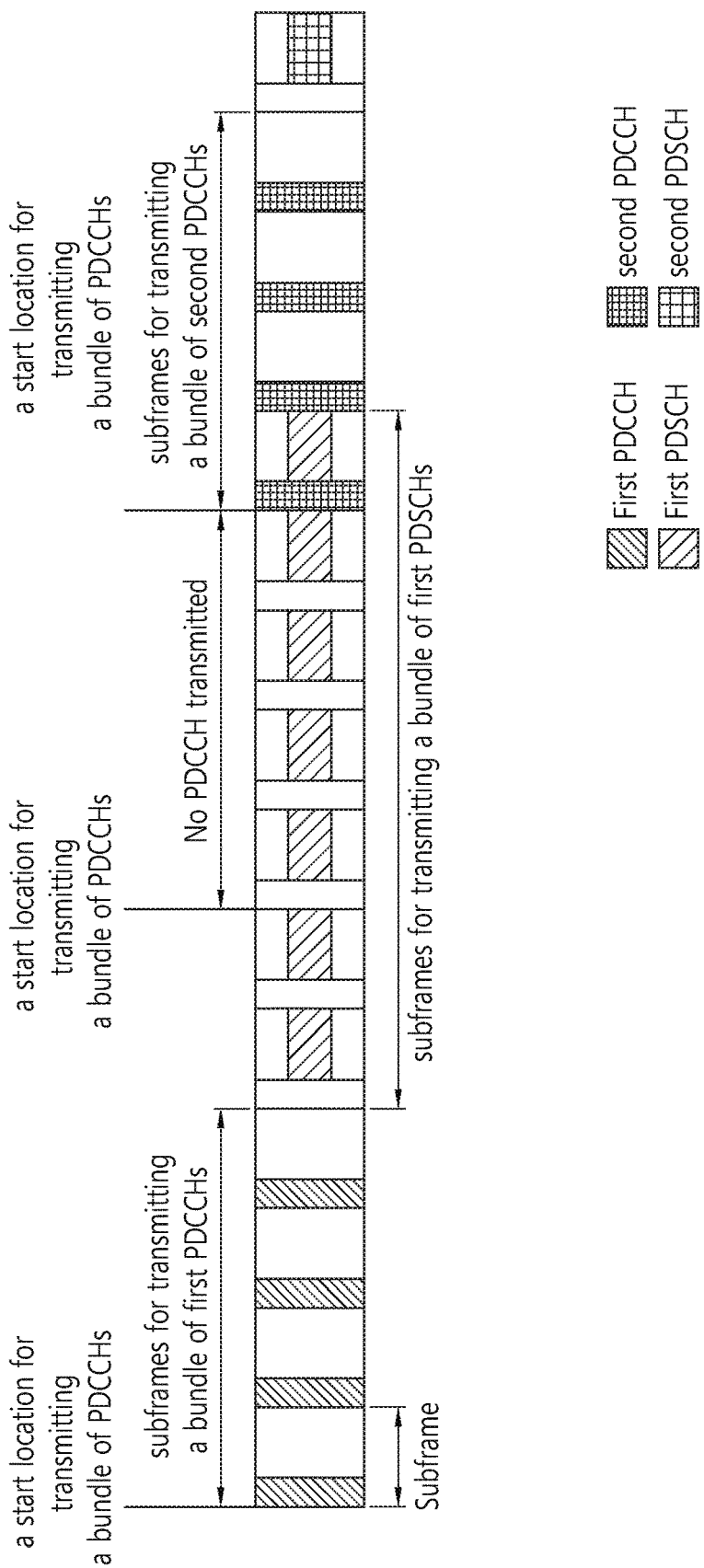
FIG. 17 illustrates a solution to a case where a first PDSCH bundle overlaps a second PDSCH bundle in the embodiment of the present invention.

FIG. 17 illustrates a solution to a case where a first PDSCH bundle overlaps a second PDSCH bundle in the embodiment of the present invention.

To avoid a collision between the transmission subframes for the first PDSCH and the second PDSCH, as illustrated in FIG. 17, the BS may not transmit the second PDSCH while transmitting the first PDSCH bundle. Thus, the MTC apparatus 100 may assume that the second PDCCH is not transmitted from the BS while the MTC apparatus 100 is receiving the first PDSCH bundle. Alternatively, the MTC apparatus 100 may assume that a second PDCCH including a new downlink grant is not transmitted from the BS while the MTC apparatus 100 is receiving the first PDSCH bundle.

Likewise, in the case of a PUSCH, the BS 200 may not transmit the second PDCCH while receiving the first PUSCH from the MTC apparatus 100. Thus, the MTC apparatus 100 may assume that the second PDCCH is not transmitted from the BS while the MTC apparatus 100 is transmitting the first PUSCH bundle.

<Fifth Solution to the Problem Illustrated in FIG. 15>

A fifth solution is for dealing with a case where a subframe for the first PDSCH and a subframe the second PDSCH collide and any one of the PDSCHs includes an SIB. Specifically, a difference between a subframe in which transmission of a PDSCH bundle including UE-specific data is started and a subframe in which transmission of a PDSCH bundle including an SIB is expected to be started may be smaller than D subframes which are the size of a PDSCH bundle. Thus, it is needed to suggest a method for the MTC apparatus to receive the PDSCH bundle including the UE-specific data and the PDSCH bundle including the SIB, which will be described in detail with reference to FIG. 18.

Figure 18:
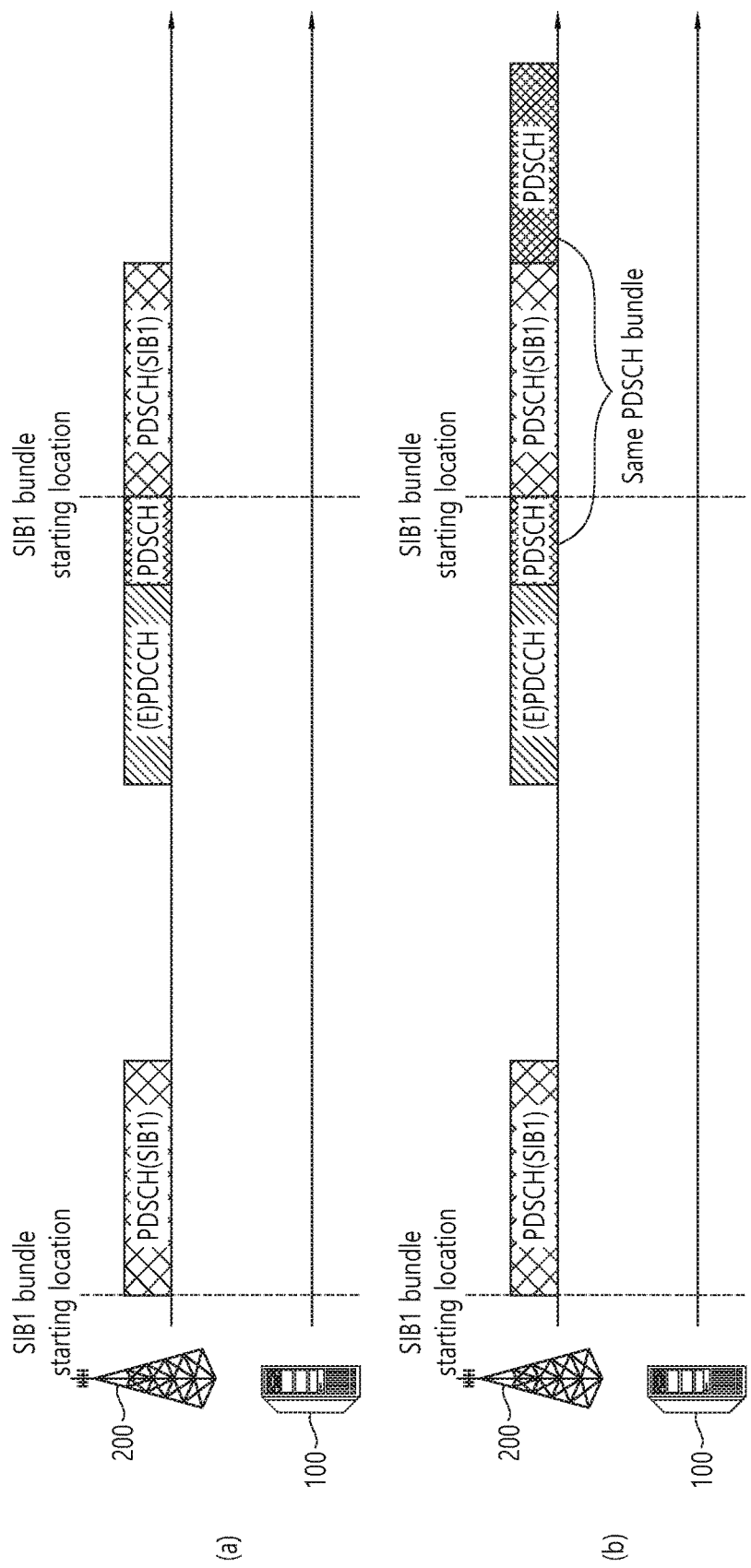
FIG. 18 illustrates a solution to a case where a first PDSCH bundle overlaps a second PDSCH bundle in the embodiment of the present invention.

FIG. 18 illustrates a solution to a case where a first PDSCH bundle overlaps a second PDSCH bundle in the embodiment of the present invention.

(a) and (b) of FIG. 18 illustrate a case where previous transmission of a first PDSCH is not yet finished until transmission of a second PDSCH bundle including an SIB is started.

Specifically, as illustrated in (a) of FIG. 18, when the BS starts transmission of the second PDSCH bundle including the SIB while the MTC apparatus 100 is receiving the first PDSCH bundle including UE-specific data, the MTC apparatus 100 may drop reception of the first PDSCH including the UE-specific data and attempt to receive the second PDSCH bundle including the SIB. Here, the MTC apparatus 100 may assume that the first PDSCH bundle including the UE-specific data is not actually transmitted from the BS on corresponding subframes. For example, the MTC apparatus 100 may assume that the first PDSCH including the UE-specific data is punctured in the corresponding subframes and thus is actually not transmitted.

Alternatively, as illustrated in (b) of FIG. 18, when the BS starts transmission of the second PDSCH bundle including the SIB while the MTC apparatus 100 is receiving the first PDSCH bundle including UE-specific data, the MTC apparatus 100 may suspend reception of the first PDSCH bundle including the UE-specific data until reception of the second PDSCH bundle including the SIB is finished.

Alternatively, the MTC apparatus 100 may assume that the second PDSCH including the SIB is not actually transmitted from the BS in a subframe known as a subframe in which transmission of the second PDSCH including the SIB is started. Specifically, when PRBs for the second PDSCH including the SIB partially overlap PRBs for the first PDSCH including the UE-specific data, the MTC apparatus 100 may not receive the second PDSCH including the SIB, assuming that the second PDSCH including the SIB is punctured in the corresponding PRB region, and receive only the first PDSCH including the UE-specific data. That is, the MTC apparatus 100 drops reception of the second PDSCH including the SIB. Here, when the second PDSCH including the SIB for the MTC apparatus 100 is transmitted through total N subframes, although only part of the subframes overlap subframes in which the first PDSCH is transmitted, the MTC apparatus 100 may drop reception of the entire SIB. Alternatively, when the second PDSCH including the SIB for the MTC apparatus 100 is transmitted through total N subframes and overlaps the first PDSCH including the UE-specific data in a partial or entire PRB region in part or all of the subframes overlap subframes, the MTC apparatus 100 may drop reception of the entire SIB.

Alternatively, the MTC apparatus 100 may not receive both the second PDSCH including the SIB and the first PDSCH including the UE-specific data in the corresponding frames.

While a collision between a PDSCH including an SIB and a PDSCH including UE-specific data and a solution thereto have been illustrated, the same solution may be applied to a collision between a PDSCH including cell-specific data and a PDSCH including UE-specific data. For example, when a PDSCH including cell-specific data collides with a PDSCH including UE-specific data, the MTC apparatus 100 receives the PDSCH including the UE-specific data in a corresponding subframe, assuming that the PDSCH including the cell-specific data is not transmitted from the BS. For example, the MTC apparatus 100 may assume that the PDSCH including the cell-specific data is punctured and thus is not actually transmitted. On the contrary, the MTC apparatus 100 may receive the PDSCH including the cell-specific data, assuming that the PDSCH including the UE-specific data is not transmitted from the BS. For example, the MTC apparatus 100 may assume that the PDSCH including the UE-specific data is punctured and thus is not actually transmitted.

Alternatively, the MTC apparatus 100 may not receive both the PDSCH including the cell-specific data and the PDSCH including the UE-specific data in the corresponding frame.

The aforementioned embodiments of the present invention can be implemented through various means. For example, the embodiments of the present invention can be implemented in hardware, firmware, software, combinations thereof, etc. Details thereof will be described with reference to the drawing.

Figure 19:
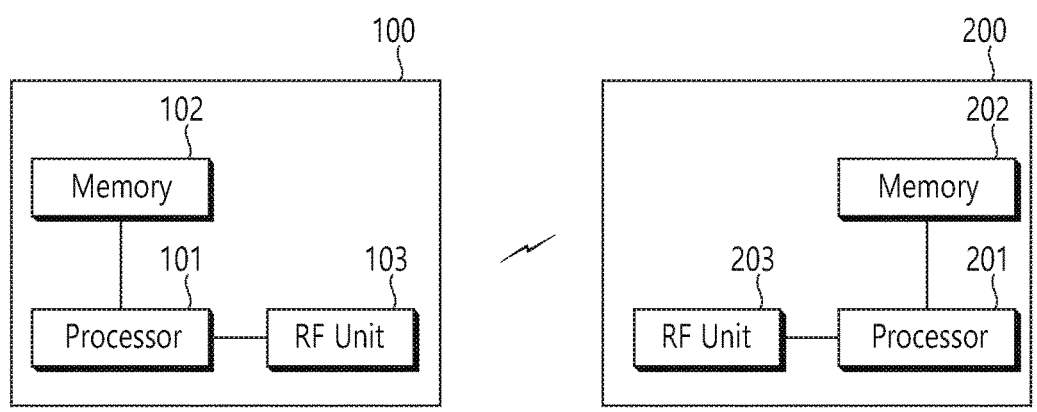
FIG. 19 is a block diagram illustrating a wireless communication system according to an embodiment of the present invention.

FIG. 19 is a block diagram illustrating a wireless communication system according to an embodiment of the present invention.

A BS 200 includes a processor 201, a memory 202, and a radio frequency (RF) unit 203. The memory 202 is connected with the processor 201 and stores various pieces of information for driving the processor 201. The RF unit 203 is connected with the processor 201 and transmits and/or receives radio signals. The processor 201 implements the proposed functions, procedures, and/or methods. In the aforementioned embodiments, operations of the BS may be implemented by the processor 201.

An MTC apparatus 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements the proposed functions, procedure, and/or methods.

The processors may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment is implemented in software, the aforementioned methods can be implemented with a module (i. e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A transmission and reception method, comprising:
   receiving a first physical downlink control channel (PDCCH) including first scheduling information;
   receiving a first bundle of first physical downlink shared channels (PDSCHs) repeated in a plurality of first subframes, the first bundle received based on the first scheduling information;
   receiving a second PDCCH including second scheduling information; and receiving a second bundle of second PDSCHs repeated in a plurality of second subframes, the second bundle received based on the second scheduling information, wherein the second PDCCH is received after receiving the first bundle, wherein only one first bundle or second bundle is transmitted or received in an overlapping subframe when a physical resource block (PRB) of the first PDSCHs on some of the plurality of first subframes overlaps a PRB of the second PDSCHs on some of the plurality of second subframes, wherein the first bundle is transmitted or received when the first bundle includes cell-specific data, wherein the second bundle is transmitted or received when the second bundle includes user equipment-specific data, and wherein a bundle comprises repeated transmission on a plurality of subframes.

2. The method of claim 1, wherein the other of the first and second bundle is punctured in an overlapping PRB when only the first or second bundle is transmitted.

3. The method of claim 1, wherein transmission or reception of the first bundle is maintained and transmission or reception of the second bundle is dropped in an overlapping subframe.

4. The method of claim 1, wherein transmission or reception of the first bundle is maintained and transmission or reception of the second bundle is delayed in an overlapping subframe.

5. The method of claim 1, wherein both the first and second bundle are transmitted or received when part of the plurality of first subframes overlap part of the plurality of second sub-frames but no PRBs overlap each other.

6. An apparatus comprising:
a transceiver configured to transmit and receive signals; and
a processor coupled to a memory and configured to control the transceiver to:
receive a first physical downlink control channel (PDCCH) including first scheduling information;
receive a first bundle of first physical downlink shared channels (PDSCHs) repeated in a plurality of first subframes, the first bundle received based on the first scheduling information;

receive a second PDCCH including second scheduling information; and receive a second bundle of second PDSCHs repeated in a plurality of second subframes, the second bundle received based on the second scheduling information, wherein the second PDCCH is received after receiving the first bundle, wherein only the first bundle or second bundle is transmitted or received in an overlapping subframe when a physical resource block (PRB) of the first PDSCHs on some of the plurality of first subframes overlaps a PRB of the second PDSCHs on some of the plurality of second subframes, wherein the first bundle is transmitted or received when the first bundle includes cell-specific data, wherein the second bundle is transmitted or received when the second bundle includes user equipment-specific data, and wherein a bundle comprises repeated transmission on a plurality of subframes.

7. The apparatus of claim 6, wherein the other of the first and second bundle is punctured in an overlapping PRB when only the first or second bundle is transmitted.

8. The apparatus of claim 6, wherein transmission or reception of the first bundle is maintained and transmission or reception of the second bundle is dropped in an overlapping subframe.

9. The apparatus of claim 8, wherein transmission or reception of the first bundle is maintained and transmission or reception of the second bundle is dropped in an overlapping subframe.

10. The apparatus of claim 6, wherein transmission or reception of the first bundle is maintained and transmission or reception of the second bundle is delayed in an overlapping subframe.

11. The apparatus of claim 6, wherein both the first and second bundle are transmitted or received when part of the plurality of first subframes overlap part of the plurality of second sub-frames but no PRBs overlap each other.

* * * * *